Patented Feb. 14, 1950

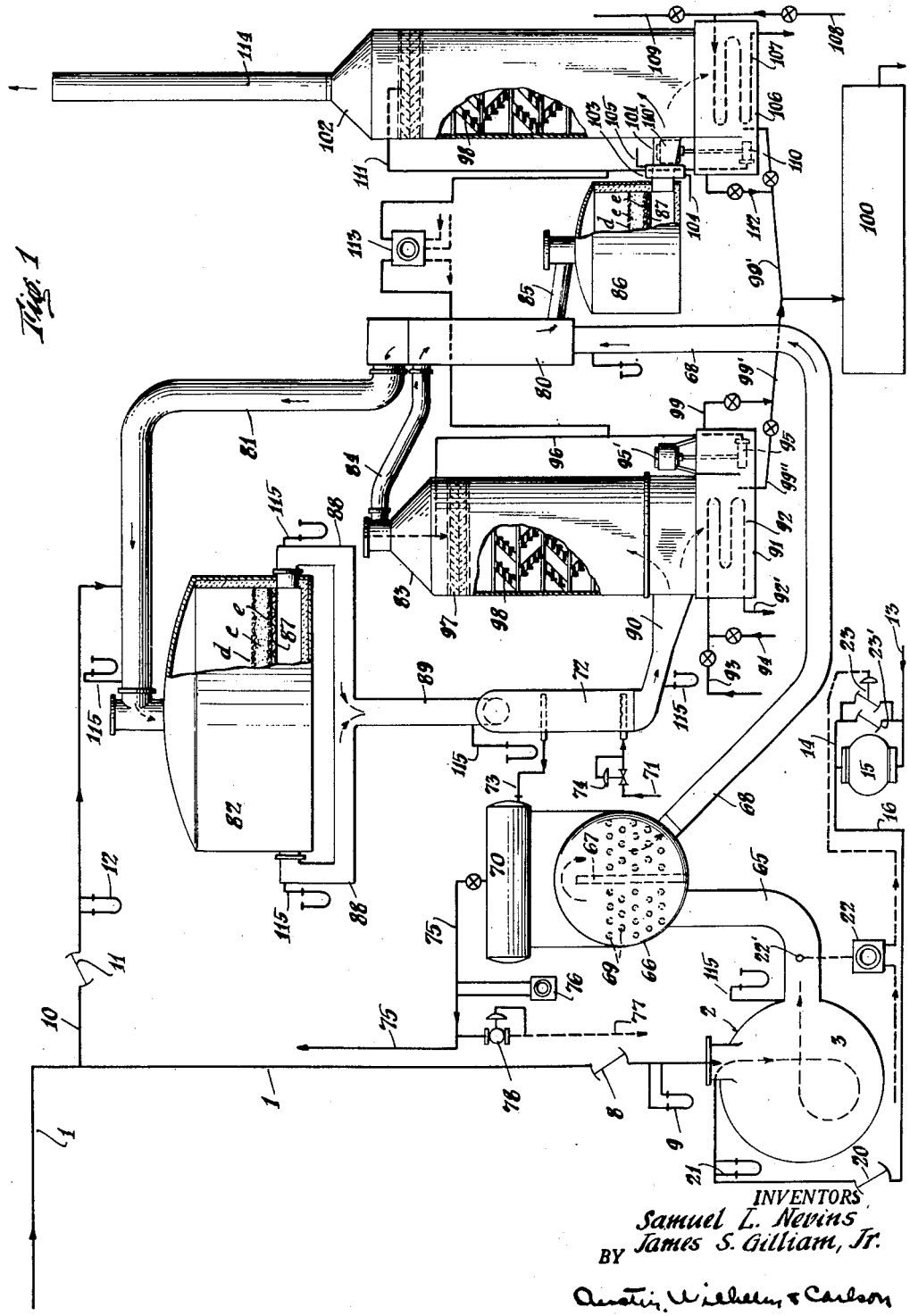

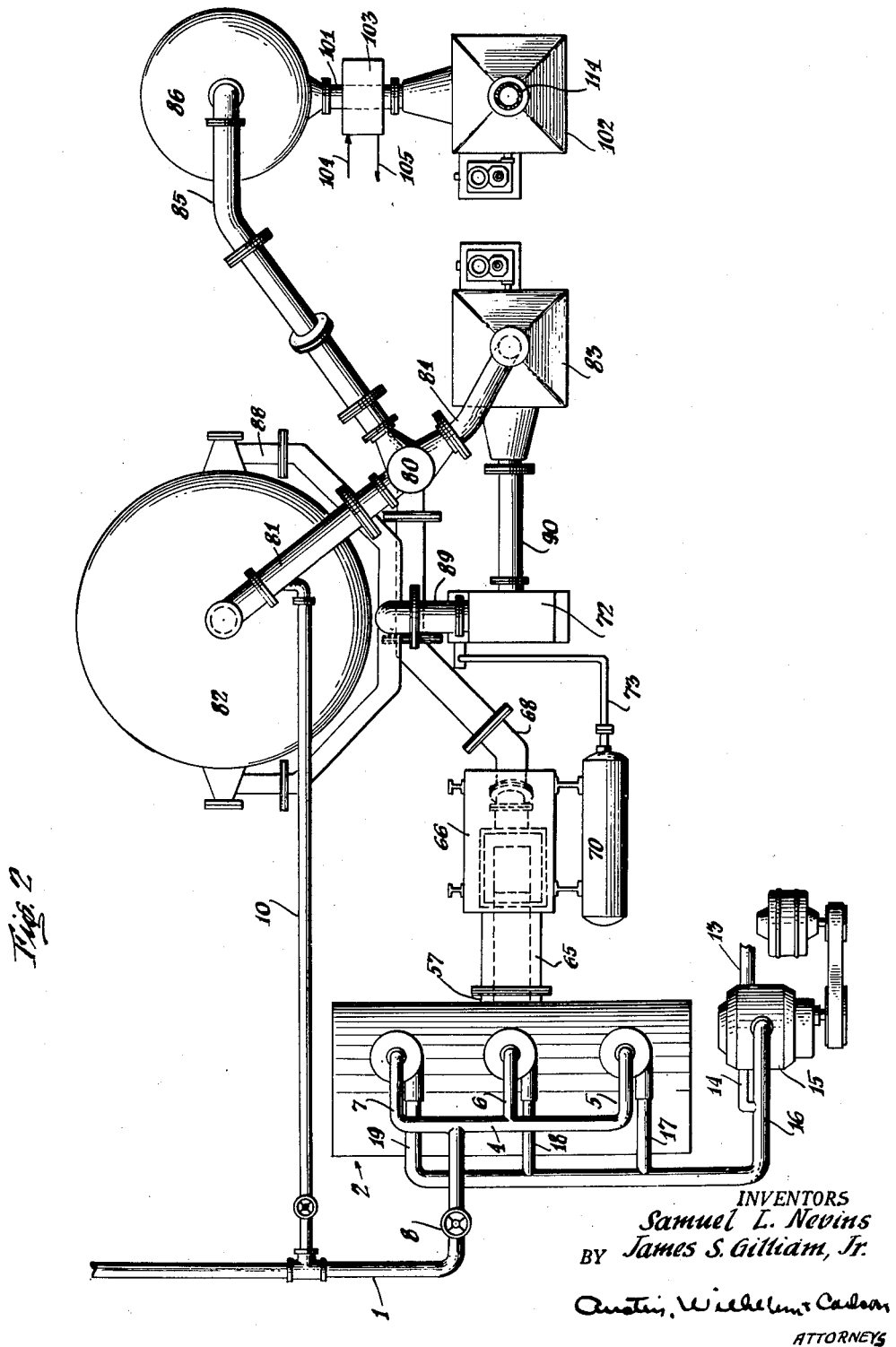

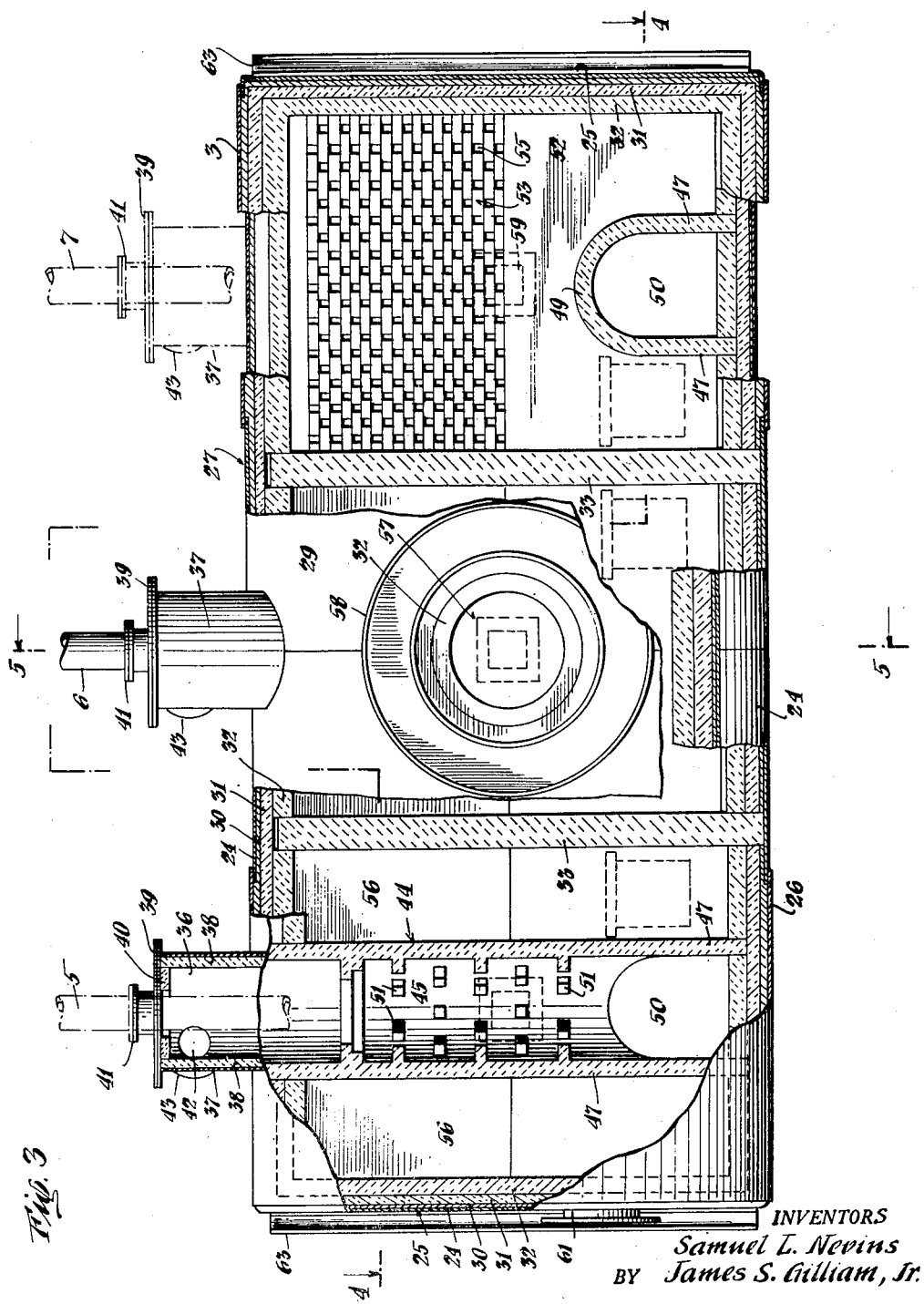

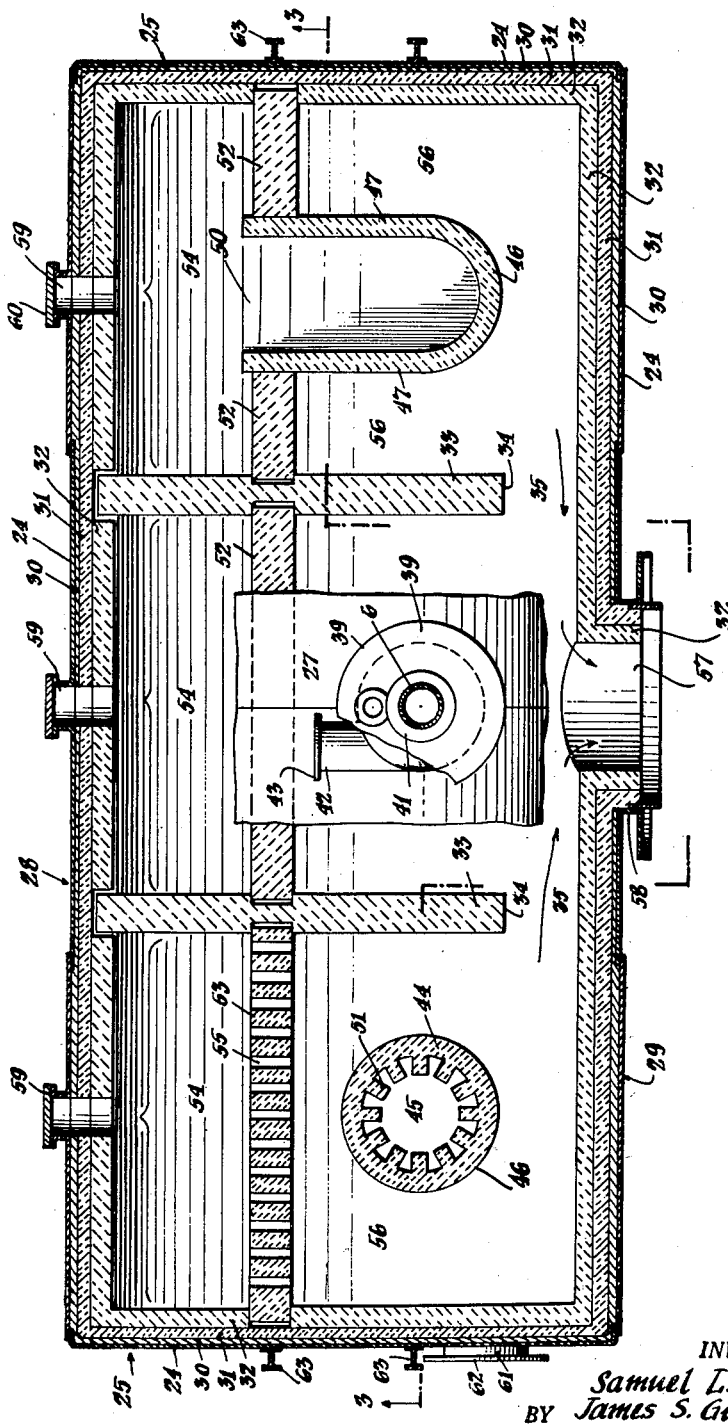

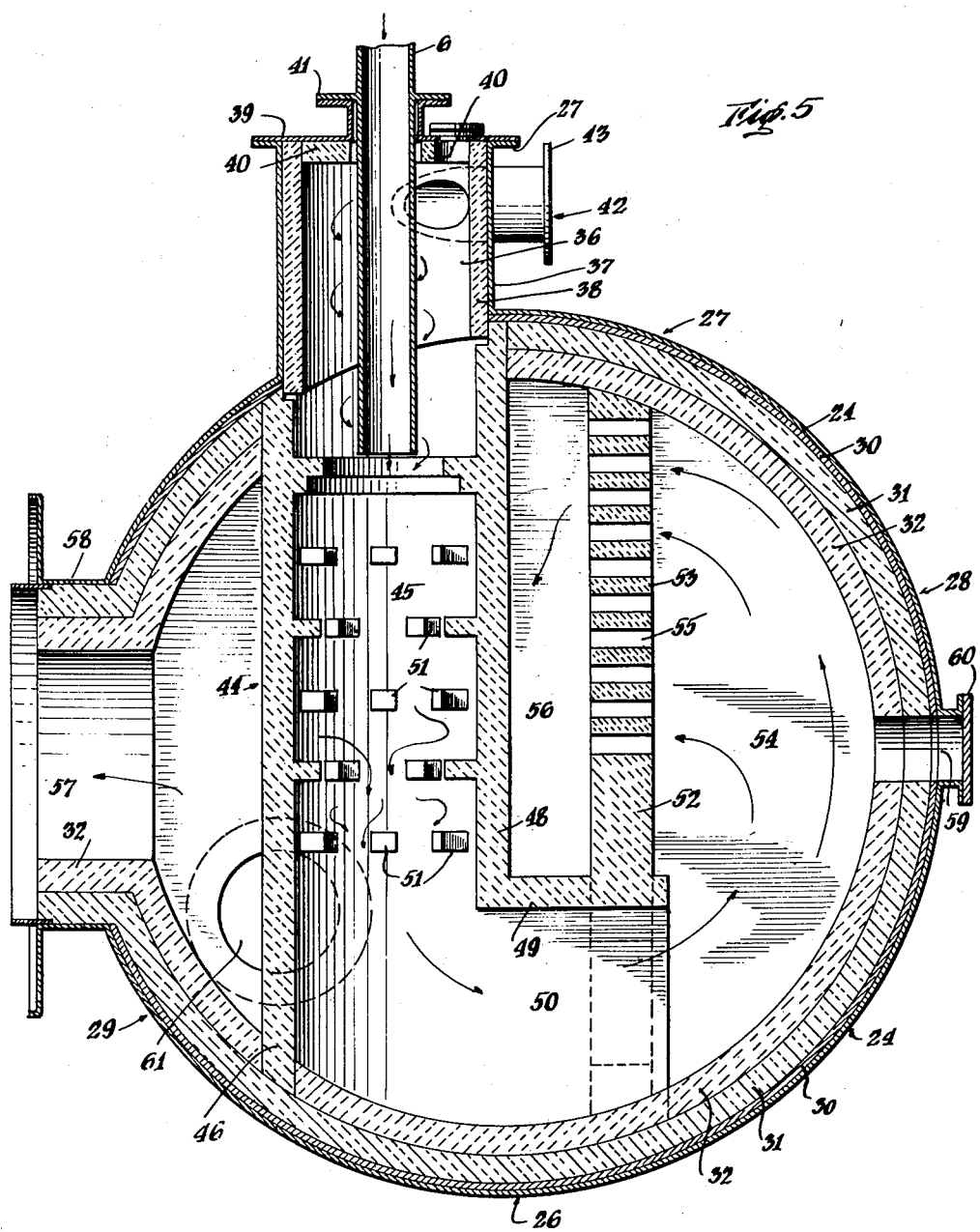

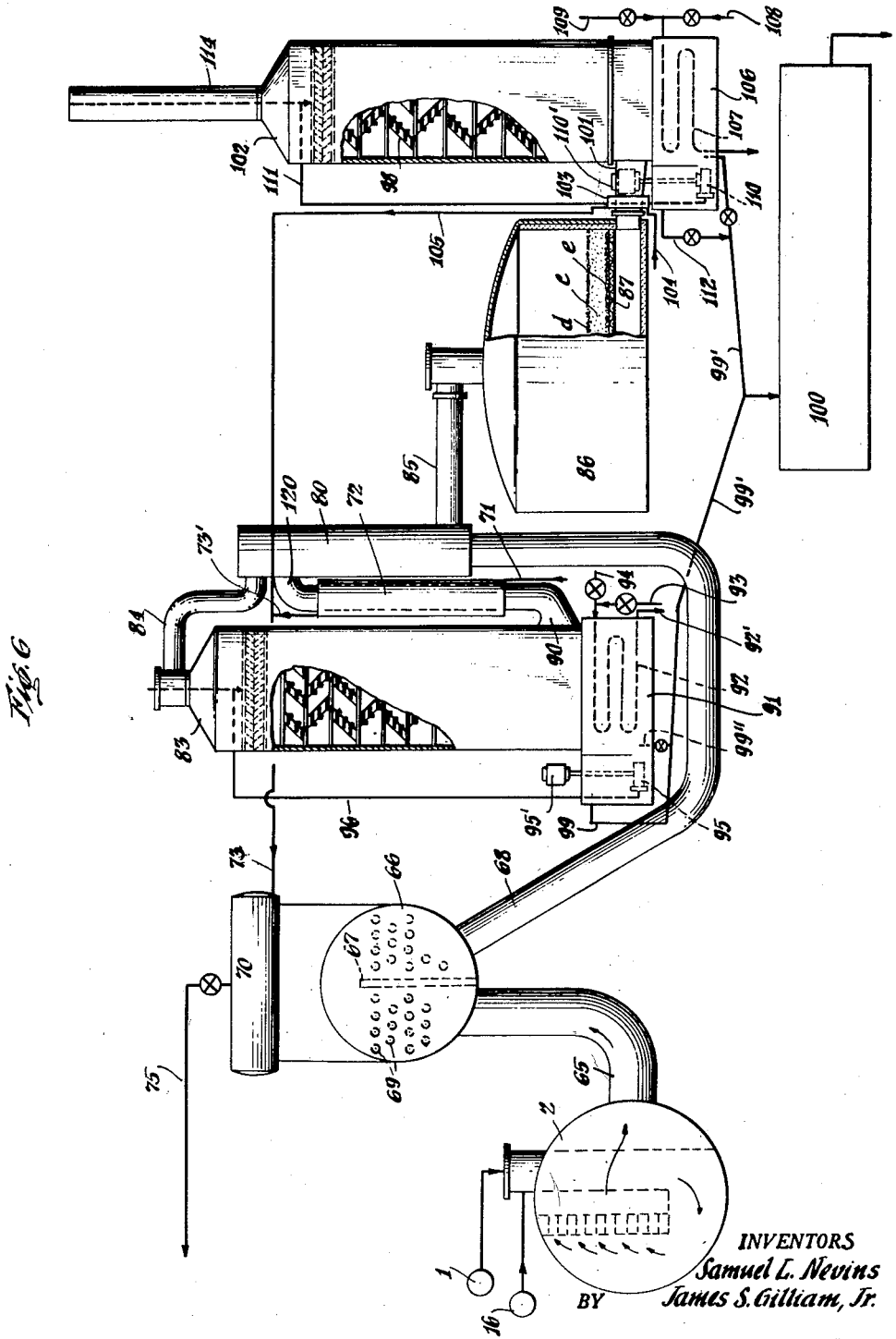

2,497,095

UNITED STATES PATENT OFFICE 2,497,095

RECOVERY OF ELEMENTAL SULFUR FROM ACIDIC GASES

Samuel L. Nevins, Little Rock, Ark., and James S. Gilliam, Jr., Shreveport, La., assignors, by mesne assignments, to Mathieson Chemical Corporation, New York, N. Y., a corporation of Virginia Application January 25, 1945, Serial No. 574,606

15 Claims. (Cl. 23—225)

This invention relates to the recovery of elemental sulphur from acidic gases containing sulphur compounds, and is more particularly directed to the treatment of hydrogen sulphide and hydrogen sulphide containing gases commonly thrown off as waste product in the refining or treatment of petroleum, natural gas, manufactured gas and chemicals.

The waste gases separated in the various purification processes employed in the manufacture of commercial natural gas, coke oven gas, and petroleum products, normally contain sulphur in the form of hydrogen sulphide and, in addition thereto, usually contain water vapor and various gaseous materials in the form of carbon dioxide, carbon monoxide, hydrogen, and in many instances sundry hydrocarbons such as methane, ethane, and propane. Again, in some waste gases are found such sulphur compounds as hydrogen sulphide, sulphur dioxide, carbonoxy-sulphide, carbon disulphide, and in certain circumstances, alkyl sulphides together with gaseous paraffinic and olefinic hydrocarbons, carbon dioxide, water-vapor and hydrogen.

Certain chemical treating plants may produce waste acidic gases containing recoverable amounts of sulphur compounds, usually mixed or combined with impurities. For example, plants for the manufacture of carbon disulphide from sulphur and methane throw off waste acidic gas containing sulphur vapor, hydrogen sulphide, methane and other hydrocarbons.

Attempts have been previously made to recover commercially profitable yields of elemental sulphur from such waste acidic gases but without success, since the reactions which are reputed to occur in the treatment of hydrogen sulphide gases are not realized when working with relatively impure gases, which may be explained in part by reaction disturbances caused by other gaseous impurities and materials which the waste input gas contains. It has therefore been common practice to burn such waste acidic gas in flare towers or under boilers, since such waste acidic gases have an obnoxious odor and are lethal in character and hence cannot be discharged into the atmosphere.

This invention is directed to a novel and commercially practical method for treating such variant types of waste acidic gases containing sulphur compounds which are in sufficient concentration to warrant commercial recovery, and a characterizing feature of the invention is its wide permissible availability for treating numerous types of sulphur-containing gases. When such waste acidic gases are processed in accordance with this invention, such waste acidic gases constitute a valuable source of material from which commercially profitable yields of sulphur of high purity may be obtained in an economical manner by continuous operation, with the final effluent gas substantially devoid of sulphur compounds and in condition for discharge to the atmosphere.

An object of this invention is to provide an improved process for the treatment of waste acidic gases containing sulphur compounds whereby elemental sulphur of high quality may be recovered therefrom in a highly economical and practical manner.

Another object of this invention is to provide an improved process for the treatment of waste acidic gases containing sulphur compounds whereby the obnoxious and toxic constituents may be substantially completely removed therefrom, thereby providing a resulting effluent gas, unharmful to animal and plant life.

Another object of this invention is to provide a highly economical and efficient process for the recovery of elemental sulphur from waste acidic gases containing hydrogen sulphide cast off from refining, gas treating and chemical operations, whereby substantially all of the sulphur compounds in such gases are removed and recovered in the form of useable elemental sulphur.

A still further object of this invention is to provide a novel process for the production of elemental sulphur from waste acidic gases containing sulphur in a combined state, which process can be carried out without the application of external heat, and whereby heat values are generated which can be advantageously converted into steam or other useful heat forms.

A further object of this invention is to provide a process for the effective conversion of waste acidic gases containing hydrogen sulphide or relatively pure hydrogen sulphide by successive and continuous treatment of the waste gases in a reaction zone and one or more catalytic conversion zones to produce elemental sulphur vapor, and thereafter condensing the produced sulphur vapor to elemental sulphur of high purity, at low cost and with a high recovery yield.

Other objects and advantages of this invention will be more readily understood and comprehended from the following disclosure.

The essential features of the process and the permissive range of operating latitude will be apparent from a consideration of the several illustrative physical embodiments of the invention shown in the accompanying drawings.

For more ready comprehension of the invention and the chemical and physiochemical factors involved in the process, there is shown in the accompanying drawings a series of embodiments of physical structure in which:

Fig. 1 is a diagrammatic side elevational view of a complete plant in which this novel process may be carried out;

Fig. 2 is a diagrammatic top plan view of the plant shown in Fig. 1;

Fig. 3 is an enlarged view of the reaction furnace wherein the initial part of the reactions takes place, this view being partly in elevation and partly in vertical cross-section to more clearly illustrate the construction and details of the furnace as the same appears when viewed along line 3—3 of Fig. 4;

Fig. 4 is another enlarged view of the reaction furnace shown partly in horizontal cross-section and partly in elevation as the same appears when viewed along line 4—4 of Fig. 3;

Fig. 5 is an enlarged vertical cross-sectional view of the reaction furnace as the same appears when viewed along line 5—5 of Fig. 3; and Fig. 6 is a diagrammatic side elevational view of a highly effective but more simplified form of plant for the recovery of elemental sulphur from waste acidic gases containing sulphur compounds.

Similar reference characters refer to similar parts throughout the several views of the drawings and specification.

In carrying out the process, the input waste acidic gas is analyzed to determine the approximate quantities of gaseous materials contained therein. As the first step in the process, a stoichiometric amount of oxygen, as in the form of air, is added to the input waste acidic gases to be treated. In determining this stoichiometric balance, consideration is given to the quantity of oxygen necessary to convert the hydrogen sulphide content of the waste acidic gas to free sulphur, the quantity of oxygen which would be given up during the reaction by other oxygen-containing gases and materials, and the oxygen required by other gaseous components and materials in the input waste acidic gas to effect oxidation thereof. By thus determining and controlling the stoichiometric amount of oxygen required in the various reactions which proceed in the system, an actual sulphur recovery of 90 per cent or more of the theoretical recovery can be obtained, even with waste acidic input gases containing as low as 15 to 20 per cent hydrogen sulphide content.

In light of the above, it is apparent that the stoichiometric amounts of air must be carefully adjusted. If more than the stoichiometric balance of oxygen is present, an excess of sulphur-dioxide will appear in the tail gases from the system; on the other hand, if materially less than the stoichiometric amount of oxygen is fed to the system, an excess of hydrogen-sulphide will be discharged in the tail gases. It is possible by employing an excess of air to react all of the hydrogen sulphide in the entering waste acidic gases, but in these circumstances an excess amount of sulphur dioxide is formed which is unavailable for the conversion of elemental sulphur unless additional hydrogen sulphide is fed into the system to effect reaction.

It is important to observe that the presence of carbon dioxide in the entering waste acidic gas does not require the addition of air beyond the stoichiometric amount and that the amount of air computed on the basis of its reaction with hydrogen sulphide in the entering waste acidic gases should still be maintained. It will be shown, however, that the presence of carbon dioxide does complicate the conversion by reason of the intermediate reactions with formation of carbon disulphide and carbon oxysulphide which must be converted in subsequent stages of the process to carbon dioxide and sulphur, and that the presence of hydrocarbon compounds in the entering waste acidic gases does require sufficient additional air to establish substantial stoichiometric balance if maximum sulphur recovery is to be attained.

As will be appreciated, important factors in establishing and maintaining the efficiency of the process are careful quantitative control of the air fed to the reaction zone and the complete and homogeneous mixing of the reactants to insure a substantially quantitative reaction. The theoretical formula for determining the proper air and entering waste acidic gas proportion is two mol volumes of hydrogen-sulphide in the entering waste acidic gas to one mol volume of oxygen in air (one mol volume equals 379 cu. ft. at 60° F. and 14.73 lbs. per sq. in. abs.). Assuming that a typical gas to be processed will contain approximately 50 per cent hydrogen sulphide, the theortical quantity of the sour gas charged per unit of time is determined as follows:

$$\frac{2H_2S}{.5} = \frac{379}{.5} \times 2 = 1516 \text{ cu. ft. of acidic gas at } 60° \text{ F. and } 14.73 \text{ lbs. per sq. in. absolute}$$

The same quantitative amount of air (21% $O_2$) required in the reaction per unit of time similarly is determined as follows:

$$\frac{O_2}{.21} = \frac{379}{.21} = 1806 \text{ cu. ft. of air at } 60° \text{ F. and } 14.73 \text{ lbs. per sq. in. absolute}$$

In order to achieve stoichiometric balance it is necessary to make a careful analysis of the entering waste acidic gases so that stoichiometric balance can be computed. All of the reactive gases which contain sulphur fed into the unit must be considered in computing the stoichiometric balance. Thus, in addition to hydrogen sulphide, such gaseous compounds as sulphur dioxide, carbon disulphide and carbonoxy-sulphide if present, should be considered. Also, in computing the stoichiometric balance, the hydrocarbons present in the entering waste acidic gases must be taken into consideration and a sufficient amount of oxygen supplied to react therewith to form carbon dioxide and water vapor.

If the hydrocarbon content of the entering gas changes, the established air to gas ration will be unbalanced and will necessitate a proportionate change in the quantity of air to consume the excess hydrocarbons. A large quantity of hydrocarbons in the acid gas fed, should be avoided because a large volume of hydrocarbons may tend to deposit carbon in the system with consequent danger of contaminating the recovered sulphur, and cause a higher stack loss of hydrogen sulphide and sulphur dioxide. The process described herein is, however, designed for a relatively wide permissive latitude in hydrocarbon content and can accommodate the hydrocarbons normally encountered in acid gas without producing appreciable carbon deposits or stack loss.

In a typical operation therefore, assuming the entering waste acidic gas contains 50 per cent of hydrogen sulphide, the proportion of the gas to air charged to the reaction zone is 1516 cu. ft. entering waste acidic gas to 1806 cu. ft. air. If the entering waster acidic gas contains hydrocarbons, sufficient additional air should be added to effect complete combustion thereof. When such quantitative amounts of reactants are supplied and are treated in accordance with the method to be described, high yields of elemental sulphur are secured.

The process is carried out by mixing sulphur containing waste acidic gases with substantially stoichiometrically established quantities of oxygen, as defined above, under such conditions of turbulent flow and temperature as to insure complete and homogeneous mixing.

In the preferred or optimum operation of the process, it is desirable to secure a substantially complete conversion of the waste acidic gases not only to recover the greatest amount of valuable elemental sulphur, but also to reduce the content of the hydrogen sulphide and sulphur dioxide in the effluent gases so that such effluent gases will not constitute a nuisance when discharged into the atmosphere. In such preferred operation, the effluent reaction gases discharged from the primary reaction zone are substantially reduced in temperature and moved into contact with catalytic material to insure oxidation of any remaining hydrogen sulphide and the reduction of contained sulphur dioxide ($SO_2$), carbonoxy sulphide (COS) and carbon disulphide ($CS_2$) to sulphur vapor. By such catalytic treatment of the reaction gases discharged from the reactor, approximately 85 to 90 per cent of the sulphur compounds in the waste acidic gas may be converted into elemental sulphur vapor. The thus treated reaction gases are then preferably further reduced in temperature and scrubbed and cooled with a scrubbing and cooling agent, such as molten sulphur, to condense the sulphur vapors and recover the condensed sulphur. As a further refinement, the scrubbed gases thus produced may be given a further pass through an additional catalyst bed to reduce remaining amounts of unreacted gases to sulphur vapor, which vapor is removed by scrubbing and cooling treatment. By pursuing this further step, it has been found that 95 per cent of the available sulphur in the waster acidic gas may be removed and recovered as valuable elemental sulphur.

No external source of heat is employed after the process has been placed in operation. On the contrary, the heat of the reaction carried out as the initial step in the reaction furnace results in a reaction gas temperature of from approximately 1600° to 2400° F., which heat of reaction may be advantageously extracted and utilized in the production of steam.

The production of one long ton of sulphur according to the process will produce approximately 6,000 pounds of steam at 300 pounds pressure when acid gas containing approximately 50 percent hydrogen sulphide is processed.

It would appear that the oxidation of the hydrogen sulphide content of the gas to elemental sulphur should be a relatively simple operation, which presumably would proceed according to the equation—

(1) $\quad 2H_2S + O_2 \rightarrow S_2 + 2H_2O$

It has been ascertained, however, that the conversion is not such a simple matter because the impurities usually present add to the complexity of the reactions taking place, and the changes in the reactions occur under different temperature conditions. For example, when the waste acidic gas feed contains carbon dioxide and hydrocarbons, it has been established that a whole series of reactions take place in the reaction furnace, as indicated by the following equations:

(2) $\quad H_2S + \frac{1}{2}O_2 \rightarrow H_2O + \frac{1}{2}S_2$ (3) $\quad H_2S + 1\frac{1}{2}O_2 \rightarrow H_2O + SO_2$ (4) $\quad H_2S + CO_2 \rightarrow H_2O + COS$ (5) $\quad 2H_2S + CO_2 \rightarrow 2H_2O + CS_2$ (6) $\quad H_2S + CO_2 \rightarrow H_2O + CO + \frac{1}{2}S_2$ (7) $\quad H_2S \rightarrow H_2 + \frac{1}{2}S_2$ (8) $\quad CH_4 + 2O_2 \rightarrow 2H_2O + CO_2$ (9) $\quad C_2H_6 + 3\frac{1}{2}O_2 \rightarrow 3H_2O + 2CO_2$ It will be noted, from an inspection of Equations 2 and 3, that both elemental sulphur and sulphur dioxide are formed in the reaction furnace. These two reactions proceed simultaneously, but at a different reaction rate, so that when the reactions are completed, the reaction gases will contain both gaseous sulphur and sulphur dioxide.

It is important to observe at this point that carbon dioxide content of the waste acidic gas (see Equations 4 and 5) reacts with hydrogen sulphide to form carbonoxy-sulphide and carbon disulphide, thus reducing the amount of elemental sulphur which is formed, at this stage of recovery. This situation is aggravated when the reaction gases are cooled, as, for example, in a boiler in a manner to be described. Under the lowered temperature conditions obtaining in the boiler, the following series of reactions appear to take place:

(10) $\quad 2CO_2 + \frac{1}{2}S_2 \rightarrow 2CO + SO_2$

(11) $\quad CO + \frac{1}{2}S_2 \rightarrow COS$

(12) $\quad CS_2 + 3O_2 \rightarrow CO_2 + 2SO_2$

(13) $\quad 2H_2O + 1\frac{1}{2}S_2 \rightarrow 2H_2S + SO_2$

As will be seen subsequently, gases from the boiler are further reduced in temperature in the preheater. Under the new equilibrium conditions obtaining in the preheater, additional reactions take place, as is indicated by the following equations:

(14) $\quad COS + H_2O \rightarrow CO_2 + H_2S$

(15) $\quad 2H_2O + 1\frac{1}{2}S_2 \rightarrow SO_2 + 2H_2S$

Assuming that the entering waste acidic gases contain no carbon dioxide, hydrocarbons or other reaction impurities, and that the stoichiometric amount of air is fed to the furnace, the furnace effluent reaction gases will contain sulphur vapors, sulphur dioxide and hydrogen sulphide in stoichiometrically balanced amounts in the approximate equilibrium at that particular temperature. This equilibrium, however, is not the same at different temperatures. When the furnace effluent reaction gases are cooled, as in the boiler, a new equilibrium is established at such lower temperature with the formation of additional sulphur vapor due to the reaction between some of the hydrogen sulphide and sulphur dioxide.

If the waste acidic gases to be treated contain a substantial amount of carbon dioxide, the exit furnace gases, stoichiometrically balanced, may contain no hydrogen sulphide although it would be expected that such furnace effluent reaction gases would contain a small amount of hydrogen sulphide. The substantial absence of the hydrogen sulphide may be explained by the fact that the carbon dioxide content of the waste acidic gas reacts with hydrogen sulphide (see Equations 4, 5 and 6) to form substantial amounts of elemental sulphur vapor and sulphur compounds which may subsequently be converted to elemental sulphur. It will thus be seen that the presence of substantial amounts of carbon dioxide in the entering waste acidic gases serves to effect substantially complete elimination of the hydrogen sulphide at the exit of the reaction furnace. When such reaction gases are cooled, however, some of the sulphur vapor reacts with carbon dioxide, carbon monoxide, and water, according to Equations 10, 11 and 13.

When the furnace effluent reaction gases, after some cooling, are contacted with a suitable catalyst in the converter, further reactions occur according to the following equations:

(16) $\quad 2H_2S + SO_2 \rightarrow 2H_2O + 1\tfrac{1}{2}S_2$

(17) $\quad 2COS + SO_2 \rightarrow 2CO_2 + 1\tfrac{1}{2}S_2$

(18) $\quad 2CO + SO_2 \rightarrow 2CO_2 + 1\tfrac{1}{2}S_2$

(19) $\quad CH_4 + 2SO_2 \rightarrow CO_2 + 2H_2O + S_2$

(20) $\quad 2H_2 + O_2 \rightarrow 2H_2O$

A difficulty with previously known processes for the recovery of sulphur from hydrogen sulphide is that other gases and impurities are commingled with the input gas containing hydrogen sulphide which have resulted in failure to obtain proper recovery reactions or a commercially profitable recovery of sulphur.

In accordance with this invention, the process is adapted for flexible operation so as to recover sulphur from sulphur-containing gases having commingled therewith various other non-sulphurous gases and materials, with resultant high sulphur recovery. The sulphur-containing gases fed into the unit are first analyzed to determine the approximate quantities of various gaseous materials contained therein, and conversion is effected by adding a stoichiometric amount of oxygen, as in the form of air, to the input gases. It will here be appreciated that sufficient oxygen is added to convert the hydrogen sulphide gas to free sulphur, minus the oxygen which would be given up in reaction by the oxygen-containing gases, or plus the amount of oxygen which the other gases in the input stream would absorb in the oxidation thereof. By thus first determining the stoichiometric amount of oxygen required to oxidize the input gases of a given analysis, an actual sulphur recovery of 90 per cent or more of the theoretical recovery can be obtained, even with input gases containing as low as 20 per cent hydrogen sulphide content.

By way of example, acidic gases have been treated containing as low as 20 per cent hydrogen sulphide and up to 70 per cent hydrogen sulphide, the remainder being largely carbon dioxide with a small amount of water in vapor form and a small quantity of hydrocarbon gases. When approximate stoichiometric balance was obtained by the addition of air, conversion in each instance proceeded smoothly and without interruption, with recovery of 90 per cent or more of free sulphur.

There are shown in Figs. 1 and 2 diagrammatical views of a commercial plant which may be designed to any desired size to treat a relatively small amount to many millions of cubic feet of waste acidic gas per day. The waste acidic gas, fed to the system through the entering waste acidic gas supply line 1, may be derived from any source such as one or more sour gas cleaning units or from any other source of waste acidic hydrogen sulphide-containing gas. The gas line 1 conducts the waste acidic gas to the intake side of a reaction furnace, which, as shown in Figs. 3, 4 and 5, may contain one or more reaction zones 3. To supply each reaction zone, the supply line 1 leads into a manifold 4 having branch lines 5, 6 and 7, which lead to the respective reaction zones 3. The feed line 1, as shown in Fig. 1, has interposed therein the control valve 8 and the indicating flow meter 9. The main gas feed line 1 may also be connected with a branch line 10, having the interposed control valve 11 and flow meter 12, through which a portion of the entering waste acidic gas may be supplied to the system at a secondary reaction zone for a purpose and in a manner more particularly to be described.

The air required for the operation is admitted through line 13 and forced by blower 15 through the line 16 and branches 17, 18 and 19 to the reaction zones 3 positioned within the furnace 2. The line 16 is provided with a block valve 20 and flow meter 21. The blower 15 is of sufficient capacity to insure the required air for the reaction and to force the gaseous products of reaction through the system.

The air supply fed to the reaction furnace 2 through the air supply line 16 is carefully controlled by providing the outlet of the blower 15 with a by-pass line 14 which leads into the air entry line 13. The volume of air forced through air supply line 16 is controlled by a pyrometer recorder controller 22 which is connected by a thermo-couple 22' established in the furnace exit gas duct 65. A motor valve 23, connected into air by-pass line 14, is controlled by the pyrometer recorder controller 22 in accordance with the variations in temperature of the furnace exit gases, as indicated by the thermo-couple 22'. A hand-operated valve 23' may also be installed in by-pass line 14 for manual regulation of air volume passing through air supply line 16. It will be appreciated that a flow ratio controller could also be used to control the volume of air through line 16, in accordance with the variations in volume of acidic gas flow to the system through supply line 1. By thus properly controlling volume of the air and entering waste acidic gas fed, losses by way of hydrogen-sulphide and sulphur dioxide can be reduced to 1 per cent or below of the effluent gases discharged from the plant, equivalent to an over-all sulphur conversion efficiency of from 95 to 98 per cent during continuous operation.

The furnace and reaction zones therein are designed so that concurrent streams of entering waste acidic gas and air are contacted and homogeneously mixed in passageways or conduits, which latter are heated by the high temperature products of reaction. As will be seen, the flow of gases through the reaction zones is essentially regenerative, thus establishing a turbulence which positively insures homogeneous mixing and uniform distribution of heat through the gas mixture.

The furnace would normally be designed to withstand pressures of about 5 lbs. per sq. in. It is found in actual practice that the internal furnace pressures do not materially exceed 2½ lbs. per sq. in. Such furnace pressures, as will be appreciated, are established and controlled by the back pressure developed through the system. The back pressure may vary, particularly if the system becomes fouled or particularly corroded resulting in an increased resistance to flow. Therefore the furnace should be designed with a sufficient factor of safety to take possible back pressure into account.

The reaction furnace, as shown more particularly in Figs. 3, 4 and 5, comprises an enclosed container having an external shell 24 built up of heavy steel plate. The furnace may be either generally circular or polygonal in cross-section with enclosing end walls 25 which close the ends of the body wall. The furnace shown in Figs. 3, 4 and 5 is illustrated as having a body wall of generally circular cross-section and for convenience in description, the body wall will be designated as comprising a bottom wall section 26, a top wall section 27, a rear wall section 28, and a front wall section 29 enclosed between the end wall sections 25. The interior walls of the furnaces are lined with suitable refractory and heat insulating material which may consist of a layer 30 of suitable plastic insulating material, a layer 31 of light weight insulating brick and an inner layer 32 of firebrick.

The furnace may be of any desired length and diameter depending upon the production capacity desired. By way of example, such a furnace may have an internal diameter of approximately 8 feet and an internal length of approximately 24 feet. The furnace is divided into reaction compartments which define the reaction zones 3 by a plurality of dividing partitions 33, as shown more particularly in Figs. 3 and 4, which present solid walls built up from suitable firebrick. The dividing partitions or walls 33 extend from the bottom wall section 26 of the furnace to the top wall section 27 thereof and also to the rear wall section 28 of the furnace. It will be noted by referring to Fig. 4 that the front edge 34 of each dividing wall 33 extends short of the front wall section 29 of the furnace to define a passageway 35 therebetween which communicates with the adjacent reaction zone 3. Thus it will be noted that the division walls 33 extend across approximately four-fifths of the internal cross-sectional area of the furnace.

Leading into each chimney 44 is an entrance passageway 36 which is defined by a collar 37 built up of steel plate which is welded or otherwise secured to the top wall section 27 of the furnace. The steel collar 37 is suitably lined with refractory brick 38. The top of each entrance passageway 36 is closed by a steel plate 39 whose inner surface is also lined with refractory material 40. Each of the acid gas feed conduits 5, 6, and 7 extends through the entrance passageways 36 and projects a short distance into the furnace, as shown more particularly in Fig. 5. A sealing collar 41 surrounds each of the waste acidic gas entrance conduits and provides an airtight seal for the closure plate 39 through which the acid gas conduit extends. It will be noted by referring more particularly to Fig. 5 that each of the entrance passageways 36 are offset to one side of the vertical plane bisecting the longitudinal center line of the furnace. An air entrance port 42, as shown more particularly in Figs. 3, 4, and 5, leads tangentially into the entrance passageway 36 so that the entering air will swirl circumferentially around the acid gas conduit and within the entrance passageway 36. Each of the air entrance ports 42 may be provided with a flange fitting 43 for convenient connection to the branch air entrance lines 17, 18, and 19, respectively.

The reaction zones 3, defined by the end walls 25 and the division walls 33, combine the essential functions of mixing chambers, recuperative chambers and reaction chambers. As will be noted by referring to Figs. 3, 4, and 5, a chimney 44 extends vertically downward from each of the entrance passageways 36. Each of the chimneys 44 are built up of heat resistant brick or material and have an internal diameter approximately the same as the internal diameter of the entrance passageway 36, and define therein an acid gas and air mixing passageway 45 of restricted cross-section.

The front portion 46 and side portions 47 of each chimney 44 extend down to and rest upon the interior bottom wall section 26 of the furnace, while the rear wall section 48 of the chimney extends downwardly into the furnace a distance from two-thirds to three-quarters from the top wall section 27 of the furnace. The rear wall section 48 of each chimney rests upon a horizontal extending wall 49 of firebrick. The lower side wall sections 47 of each chimney 44 are extended towards the rear wall section 28 of the furnace and are joined to the horizontal wall 49 so as to provide a horizontal extending passageway 50 leading from the chimney passageway 45 towards the rear wall 28 of the furnace. Each of the chimneys 44 is provided with inwardly jutting firebricks 51 which serve to give the air and acid gas mixture moving down through the chimney passageway 45 additional turbulence, thereby to to insure thorough mixing and heating thereof.

A reaction chamber compartment wall 52 extends longitudinally through each reaction compartment and presents a solid wall of firebrick which extends from the bottom wall section 26 of the furnace to a plane extending approximately horizontally through the longitudinal center line of the furnace. The compartment walls 52 surround but do not close off the horizontal passageways 50 and extend between the end wall sections 25 of the furnace and the division walls 33 thereof. A checker-work bridge wall 53 rests upon the solid compartment wall 52 and extends to the top wall section 27 of the furnace. Each of the compartment walls 52 and associated bridge walls 53 divide the furnace interior into a rear reaction zone or compartment 54 into which the air and acid gas mixture is conducted from the horizontal passageway 50. Each reaction zone or compartment 54 has a cross-sectional area which is approximately one-third to one-fourth of the entire cross-sectional area of the furnace. The bridgework wall 53, highly heated by the reaction going on in the furnace, defines escape passageways 55 for the reaction gases which escape through these highly heated restricted passageways 55 into the open spaces 56 surrounding each chimney 44 where these gases swirl around the chimney 44 and preheat the air and acid gas undergoing mixing in the chimney passage 45. The reaction gases leaving the spaces 56 commingle in their flow through the passageways 35 and escape through a discharge port 57 at the approximate center of the front wall section 29 of the furnace. The discharge port 57 may be formed by a steel collar 58 which is welded or riveted to the steel plates forming the front wall section 29 of the furnace, the passageways 57 being suitably lined with firebrick 32.

At the start of operations, it is necessary to bring the interior of the furnace and equipment up to approximate reaction temperature. This can be accomplished by providing a preheating port 59 which extends through the rear wall sections 29 of the furnace and leads centrally into each of the reaction compartments 54. Suitable burners may be projected into each of the ports. Starting burners placed at the ports 59 of the reactor furnace 2 may be operated with any suitable fuel such as natural gas and for a time sufficient to bring the furnace up to the desired temperature of the order of from about 1375° F. to about 1500° F. When the interior of the furnace has been brought up to the desired reaction heat, the burners can be withdrawn and the ports 59 sealed off by means of a suitable closure plate 60. At such a furnace temperature immediate reaction of the acid gas-air mixture is insured, and the furnace operates continuously without the application of external heat.

In operation, the waste acidic gas enters the respective chimney passageways 45 of the furnace, through the respective acid gas lines 5, 6 and 7 which project through the entrance passageways 36, in the accurately metered amounts as hereinbefore described. Simultaneously air in accurately metered amounts is forced by the blower 15 through air supply line 16 and the air inlet lines 17, 18 and 19. The air enters each of the entrance passageways 36 in a tangential direction, and thus the air is given a swirling or helical motion as it moves downwardly through each passageway 36 and into the chimney passageways 45, causing the air streams to intimately mix with entering waste acidic gas streams as the mixtures move down through the chimney passageways 45. The mixed air and waste acidic gases passing downwardly through chimney passageways 45 are preheated by direct contact with the highly heated chimney walls. The projecting refractory bricks 51 further increase the heating effect, and in addition effect an active turbulence and consequent mixing of the gases. The gas mixture is then deflected at the bottom of the chimney passageway by the bottom wall section 26 of the furnace through the horizontal passageway 50, as indicated by the arrows in Figs. 3, 4 and 5. The gas stream passes from the horizontal passageway 50 into the reaction chamber 54 and is deflected upwardly by the back wall of the reaction chamber 54. The gas stream continues to travel through the highly heated restricted passages 55 in the checker-work wall 53, thence into the passages 56 which surround the chimney 44. The reaction gases in the passages 56 heat the walls of the chimneys 44 and thereby indirectly heat the stream of air and acid gas mixture moving downwardly through the passage 45 in the chimney 44. The reaction gases leave the spaces 56 surrounding each of the chimneys, and converge through passageway 35 and commingle in their discharge flow through the discharge port 57.

In the reaction zone the reaction conditions are adjusted so as to establish a temperature in the effluent reaction gases leaving port 57 of not substantially less than 1600° F. and preferably between about 1800° F. and 2400° F. with the practical optimum range of from 1850° F. to 2000° F., by deflecting entering waste acidic gas to No. 1 converter. As will be appreciated, this exit temperature will be influenced by the degree of insulation of the furnace, the hydrocarbon content and the hydrogen sulphide content of the entering waste acidic gas.

The furnace may be provided with conveniently arranged clean-out ports 61 which are normally sealed off by suitable closure plates 62. The furnace may be strengthened and stiffened by a suitable stiffening framework 63.

As shown in Figs. 1 and 2, the reaction gases pass from the outlet port 57 of the furnace 2 through conduit 65 and thence to the waste heat boiler 66. The waste heat boiler may be of any desired and efficient type and of suitable capacity to reduce the temperature of the reaction gases down to the order of from approximately 450° F. to about 800° F. with an approximate optimum temperature of around 600° F. As shown in Figs. 1 and 6, the boiler 66 is provided with one or more partitions 67 therein providing a circuitous passageway for the reaction gases which are discharged from the bottom of the boiler into the outlet conduit 68. The boiler is provided with water tubes 69 and a steam drum 70. Feed water from supply line 71 is fed to the economizer 72 and passes through serpentine tubes therein and is discharged therefrom at a raised temperature into line 73 and into the steam drum 70. An automatic feed water regulating valve 74 is provided in water inlet line 71 which is controlled by the water level in the steam drum 70. Steam is discharged from the drum through the high pressure line 75. Flow of steam is recorded by the meter 76. A supply of steam may be tapped off through tap line 77 to furnish any steam required for subsequent process operations. Tap line 77 may have therein a suitable steam flow control valve 78.

The reaction gases passing through the waste heat boiler 66 are discharged through the conduit 68 to preheater or heat exchanger 80 and through the conduit 81 to the converter 82. In the preheater 80 the reaction gases pass in indirect heat exchange relationship to gases withdrawn from the upper portion of condensing tower 83.

In passage through the preheater 80 the reaction gases entering from line 68 at a temperature 450° to 800° F. are reduced in temperature to between about 350° F to 750° F. with an optimum temperature of approximately 500° F.

The reaction gases entering the top of converter 82 flow downwardly through a bed c of a suitable catalyst such as alumina, bauxite, iron oxide, calcium sulphate, silica gel or other catalysts which facilitate the formation of elemental sulphur and is sufficiently refractory to withstand the operating temperatures. The catalyst is preferably employed in the form of a granular mass supported on a heat and corrosion resistant foraminous member such as a stainless steel screen 87.

In event that air in excess of a stoichiometric amount is admitted into the furnace 2, the reaction gases entering the converter 82 through line 81 may be mixed with predetermined amounts of acid source gas diverted through line 10 as shown in Fig. 1 so that a stoichiometrical balance is attained in the converter. In this manner a proportion of acid source gas may be treated in the converter 82 without passing through the high temperature reaction zones in furnace 2, in which case the temperature of the discharged reaction gas is about 300° F. above the temperature of the entering reaction gas, which temperature should be less than 1000° F.

The depth of the catalyst may vary considerably depending upon such factors as the activity of the catalysts employed, the particle size of the granules and the like. The quantity employed, as will be understood, is chosen to insure maximum conversion without undue building up of a too great resistance to gas flow. The area of the catalytic bed similarly may be varied and is essentially determined by the quantity of sulphur to be produced in the unit. It has been found desirable in practice to cover the catalyst bed with a thin layer of crushed fire brick $d$ and to support the bed on a similar thin layer of crushed fire brick $e$ spread on the retaining screen 87. This serves to prevent disturbance of the catalyst by the rapidly flowing gas stream.

The reaction taking place in the converter is exothermic. In the typical operation the temperature of the gas discharged is about one hundred degrees higher than the inlet temperature, the inlet temperature ranging from 350° to 700° F. with an optimum of approximately 500° F. and at the outlet 88 at a temperature of from 450° to 800° F. with an optimum average of about 600° F. The treated gases are discharged from the converter through the side ducts 88 and pass through a common conduit 89 to the economizer 72.

The gases passing downwardly through the economizer 72 preheat the boiler feed water up to a temperature of the order of from 300° to 450° F. in the manner described, and as a result of this abstraction of heat, the gases are reduced in temperature to approximately 370° F. to 450° F., with an optimum average of about 400° F. The gases pass from the bottom of the economizer 72 through conduit 90 to a lower portion of the condensing tower 83.

As has been previously pointed out, the condensing tower 83 functions to condense and liquefy the sulphur vapor content of the gas and to accumulate it as a liquid phase product. The tower may be of any suitable construction. As shown, it is provided in the base with a tank 91 for containing molten sulphur. Such molten sulphur may be maintained at a desired predetermined temperature by means of the coil 92 which may be fed with cooling water entering valve controlled line 93. When the unit is operating, water may be forced through the coil 92 to abstract heat from the molten sulphur at the desired refluxing temperature. In typical operation water enters the coil at about 80° F. and is discharged through line 92' at about 120° F. The coil may be connected with the steam line 94 through which steam from steam line 77 may be admitted during a shut-down period or at any other time when it is desirable to heat the sulphur contained in the tank 91.

The cooled molten sulphur from the tank 91 at the base of the tower, as shown, is forced by pump 95 driven by motor 95' through line 96 to the spray heads or similar distributing means 97 positioned in the upper part of the tower. The molten sulphur flows downwardly intimately contacts and cools the countercurrently flowing gases, condenses the sulphur vapors and accumulates the condensed or liquefied sulphur in the tank 91. The tower preferably is provided with a series of splash plates 98 which break up the molten sulphur into droplets or films which cascade down the tower sequentially from baffle to baffle, thus insuring maximum contact with upflowing gases and consequent effective heat exchange. The molten sulphur accumulating in the tank 91 at the base of the tower may be drained off continuously or intermittently through the overflow weir line 99 and the insulated line 99' to the receiving vessel 100, which may be suitably heated to allow ready removal of the elemental sulphur in liquid form. The line 99' may be provided with an extension 99'' for the purpose of tapping and draining the tank 91 when desired.

In order to secure maximum liquefaction of the sulphur vapors entering the tower 83, it is desirable that the overhead reaction gases discharged from the tower through line 84 be held at approximately 260° F., that is to say, the overhead reaction gas escaping from the tower should be as close to the freezing point of sulphur as possible, and preferably only sufficiently above the freezing point to prevent the solidification of sulphur in the upper part of the tower.

In the tower, due to the direct contact of the molten sulphur with the entering reaction gas, the temperature of such entering reaction gas is rapidly reduced. For example, in typical operation the entering reaction gas is discharged from the economizer 72 to the condensing tower 83 at a temperature of about 400° F. In passing upwardly through the tower, the reaction gases are substantially cooled and are discharged at a temperature of about 260° F.

It is found that when operating the process in the manner described, the entering reaction gases discharged from the top of the tower 83 are substantially denuded of free sulphur and contain but a small amount of combined sulphur. Numerous tests indicate that the combined sulphur ($H_2S + SO_2$) in such gases is only approximately 2% to 5%. If desired, this gas may be discharged from the system. Additional quantities of sulphur, however, can be recovered economically from such overhead reaction gas in the manner shown in Figs. 1 and 2.

As previously explained, the overhead reaction gases from the condensing tower 83 flow into the preheater 80 at a temperature of approximately 260° F. and there pass in indirect heat exchange relationship with higher temperature reaction gases supplied by line 68. As a result of such heat exchange the temperature of the overhead reaction gas from tower 83 is raised to approximately 400° F. to 700° F. with an optimum temperature of about 450° F. This overhead reaction gas is passed to the second catalytic converter 86 which is the same in essential details as converter 82. Since the overhead reaction gases entering the converter 86 contain relatively small amounts of sulphur compounds the converter 86 can be appreciably smaller than converter 82. The catalyst bed $c$ in the converter 86 should be sufficient oversize area to take care of unexpected loads and avoid any appreciable back pressure. In passage through converter 86 a substantial proportion of these sulphur compounds are reduced to elemental sulphur in vapor form. In typical operations the content of the hydrogen sulphide and sulphur dioxide in the gas discharged from this second converter is approximately one per cent by volume.

The gases are discharged from converter 86, at a temperature of from about 420° F. to 600° F., are passed through conduit 101 to the lower section of a second condensing tower 102, which is similar in structure and function to tower 83. A water cooler 103 is preferably connected to gas outlet conduit 101 so as to cool the gases therein to approximately 300° F. Cool water is supplied to the reaction gas cooler 103 through water line 104 and the hot water from the cooler may be piped from outlet line 105 to the steam drum 70.

The tower 102 is provided with the tank 106 at the bottom thereof for the accumulation of molten sulphur, the temperature of which is controlled by the coil 107. Water may be passed through the coil 107 from line 108 to abstract heat from the molten sulphur in the manner previously described. The coil may also be connected with steam line 109 supplied by tap line 77 so that an elevated temperature may be established in the tank at any time, as for example during shut-down periods and the like. Molten sulphur is pumped to the top of the tower through line 111 by pump 110 operated by motor 110'. The molten sulphur is distributed by means of a distributor over the baffle plates 98 in the tower 102 and is recurrently dispersed into droplets or filaments which intimately contact the upwardly flowing reaction gases and cool these gases to the liquefaction point of sulphur, which liquefied sulphur accumulates in the tank 106. The accumulated sulphur in tank 106 is continuously or intermittently withdrawn through weir line 112 and is discharged into insulated line 99' and into the storage vessel 100. The temperature recorders 113 record the temperature of the molten sulphur circulated through lines 96 and 111. The gases and vapors uncondensed in the towers 102 pass out the stack 114. This effluent gas contains substantially all the carbon dioxide in the acid entering waste gas feed, the nitrogen from the air feed and water vapor contained in the waste acid gas and air feed, and produced during the reaction, together with the indicated minor amounts of hydrogen sulphide and sulphur dioxide which is so small that it may be discharged into the atmosphere. Pyrometer points and pressure gages 115 may be located at various important points in the system so that full control over the operation may be obtained.

A plant of the type described operates efficiently on waste acidic gas having a hydrogen sulphide content of the order of 60 per cent or more down to about 15 per cent and containing in addition carbon dioxide, water vapor and sundry hydrocarbons. In most instances it has been found that for the economic commercial recovery of sulphur the waste acidic gas should not be below about 15 per cent to 20 per cent of hydrogen sulphide, unless in large quantities. Obviously, however, where the criteria of public health and the nuisance character of the source material become important in a particular case, the novel operation may be desirable on gases containing relatively low concentrations of hydrogen sulphide, the cost being considerably reduced by the credit derived from the recovered sulphur.

As noted hereinbefore, the unit presents a wide permissive flexibility in operation. In lieu of the described operation, i. e., in which all of the waste acidic gas and air are passed through the furnace, operations may be conducted in which a split feed of entering waste acidic gas is utilized. In this operation, as previously described, all of the air required for the operation is passed through the furnace admixed with from ⅓ to ½ or more of the entering waste acidic gas and the remaining waste acidic gas is fed to the converter 82 through line 10 in a manner to obtain a stoichiometric balance in the converter 83. The exothermic heat developed in the converter is sufficient to maintain continuous conversion of the split gas feed.

As will have been noted, the striking efficiency of the operation is due to a considerable degree to the design of, and effective control of operating conditions in the furnace. It will be further noted that the process depicted in Fig. 1 represents what might be called the optimum operation in that it is designed to recover the maximum amount of sulphur from the gaseous source material. There are a number of operations of more simplified form and which require somewhat less apparatus which may be conducted, a typical example of which is shown in Fig. 6. Whereas, the process disclosed in Fig. 1 involves in effect, three progressive conversion stages, i. e., conversion in the furnace and sequential conversions in converter 82 and converter 86, the method shown in Fig. 6 utilizes two conversion stages, namely the high temperature furnace conversion and one lower temperature catalytic conversion stage with appropriate intermediate cooling and temperature control. The principles of operation of the unit shown in Fig. 6 are the same as those embodied in Fig. 1, the only essential difference being that in such operation the ultimate percentage recovery of sulphur is less than the potential recovery which is achieved in the unit of Fig. 1.

As shown in Fig. 6 the essential units of the apparatus include the furnace 2, the waste heat boiler 66, the heat exchanger 80, the economizer 72, the first scrubbing tower 83, catalytic converter 86, the water cooler 103, and the second scrubbing tower 102. The structure and function of these elements are as previously described for Fig. 1.

In operation, entering waste acidic gas and stoichiometrically proportioned amounts of air are concurrently fed to the furnace through the lines 1 and 16, respectively. In the furnace, which is similar in structure as that shown in Figs. 3, 4 and 5, the gases are homogeneously mixed, highly heated and are reacted to produce a proportion of elemental sulphur in vapor form. The reaction gases pass from the furnace, at a temperature of from approximately 1600° F. to 2400° F., through the conduit 65 to the waste heat boiler 66. The boiler is provided with the steam drum 70 to which feed water is admitted from line 73 and from which generated steam is withdrawn through line 75.

The feed water, if desired, may be preheated in the economizer 72 supplied with water through line 71 and discharged into branch line 73' which feeds into the feed water line 73. Additional hot water is generated by the cooler 103 supplied with water through line 104 and discharging into hot water line 105 which may also supply the feed water line 73.

The reaction gases are discharged from the boiler 66 into the conduit 68 at a temperature ranging from 450° to 800° F. and are conducted into the heat exchanger 80 where they are cooled down and discharged at a temperature of 400° to 500° F. through conduit 120 leading into the upper end of the economizer 72. In the heat exchanger 80 the reaction gases from the boiler preheat the overhead reaction gases which are discharged from the top of tower 83 through the line 84. The reaction gases entering the economizer are cooled by the water entering the lower end of the economizer and discharge into conduit 90 at a temperature of about 300° F. at which temperature the reaction gases enter the lower end of the scrubbing tower 83.

As has been previously described, the tower 83 is provided with a tank 91 located in the base for the accumulation of molten sulphur. The sulphur in tank 91 may be maintained at the described desirable temperature of between 260° F. and about 280° F. by means of the coil 92 through which a cooling medium is admitted from line 93 or a heating medium is admitted through line 94, either of which is discharged through line 92.

Reaction gases flowing upwardly through the tower 83 are contacted by streamlets of molten sulphur forced to the upper section of the tower through line 96 by pump 95 driven by motor 95'. As a result of such contact, as has been explained, the gases are cooled and the sulphur vapors are condensed and collected in the tank 91. The molten sulphur is withdrawn through weir line 99 into the accumulator tank 100. The temperature of the sulphur in tank 100 may be maintained at the desired temperature by a heating coil.

The overhead reaction gases from the tower 83 enter the heat exchanger 80 at a temperature of from about 260° F. to 280° F. and in passage through the heat exchanger 80 are preheated to the order of from about 400° F. to about 500° F. and are then passed to the converter 86 wherein further conversion of sulphur-containing gases to free sulphur in vapor phase occurs. The converter 86 is of the same construction as above described, and is provided with a bed of catalytic material c of the class previously mentioned. Reaction gases pass from the converter 86 at a temperature of 420° to 550° F. and thence to the tower 102 through conduit 101. These reaction gases are preferably cooled by the cooler 103 in conduit 101 to a temperature of about 300° F.

The reaction gases are then contacted with molten sulphur in tower 102 pumped from the tower tank 106 by pump 110 driven by motor 110' through line 111 to the top of the second tower 102. The molten sulphur descends in the tower 102 in the form of droplets sequentially from baffle to baffle 98 and functions to condense the sulphur vapor contained in the gas and accumulate it in the tank 106 at the base of the tower. Such molten sulphur may be drawn from the base of the tower through the weir line 112 to the accumulator tank 100. The desired temperature of from 260° F. to about 280° F. is maintained in the sulphur tank 106 by means of the cooling coil 107. As heretofore described, this coil may be connected to a water line 108 and to the steam line 109, for cooling or heating the sulphur as desired.

It will be noted that all units of the apparatus are so designed that any molten sulphur which may form at any point in the system will drain through the system or through appropriately located drain lines leading to the molten sulphur tanks so that the formation of molten sulphur in the system does not impede or interfere with the operation.

It will now be seen that the process comprises a series of steps which are intimately correlated to insure novel results. Exceptionally high yields of elemental sulphur from hydrogen sulphide are attained by utilizing the novel recuperative furnace where intimate mixing, rapid preheating and high reaction are attained at the optimum high temperatures. The sensible heat in the exit gases are not only ultimately recovered, as for example, in a form of available steam, but also such heat is utilized currently in the cycle to adjust the temperature of the gases discharged from the scrubber tower 83 to that range which insures optimum conversion in the catalytic reduction stage.

It will also be appreciated that technical utilization may be made of the tail gases. As noted, these have a high content of carbon dioxide. Whenever desired, such gases may be further treated to purify them and to recover the carbon dioxide in substantially pure state as a gas, liquid or solid.

Attention is directed to our copending applications Serial No. 574,608, filed January 25, 1945; Serial No. 574,607, filed January 25, 1945, and Serial No. 83,906, filed March 28, 1949.

While preferred embodiments of the invention have been described, it is understood that these are given didactically to illustrate the fundamental principles involved, and not as limiting the useful scope of the invention to the particular embodiments illustrated.

What is claimed is:

1. A method of producing elemental sulphur from sulphide-containing gases by reaction with a quantity of air regulated to effect the formation of elemental sulphur which comprises, passing a potentially reactive gas mixture through a confined reaction zone, effecting oxidizing reactions of said mixture in said zone, discharging the gaseous products of reaction from said zone at a temperature of between about 1800° F. to about 2400° F., cooling the exit reaction gases, contacting said cooled reaction gases with a catalyst, scrubbing said catalyst treated gases with a coolant to condense and recover elemental sulphur therefrom, passing the scrubbed gases in indirect heat exchange relationship with gases discharged from said reaction zone to preheat said scrubbed gases to a temperature of between about 350° F. and 700° F., contacting such preheated scrubbed gases with a catalyst to effect further reaction of sulphur-containing gases therein to elemental sulphur, and separating and recovering elemental sulphur thus formed by scrubbing such gases with a coolant.

2. A method of producing elemental sulphur from sulphide-containing gases by reaction with a quantity of air regulated to effect the formation of elemental sulphur which comprises, passing streams of gas and air to a confined reaction zone, effecting reaction of the mixture in said zone, withdrawing gaseous products of reaction from said zone at a temperature of about 1600° F. to about 2400° F., cooling the exit reaction gases, scrubbing such cooled reaction gases with a coolant to condense and recover elemental sulphur therefrom, passing the scrubbed reaction gases in indirect heat exchange relationship with gases discharged from the reaction zone to raise the temperature of the scrubbed gases to between about 400° F. to about 600° F., contacting such preheated gases with a catalyst to effect further reaction of the sulphur-containing gases to elemental sulphur, cooling the reacted gases to a temperature of between about 270° F. and 500° F. and scrubbing such cooled gases with a coolant to condense and recover elemental sulphur therefrom.

3. A method of producing elemental sulphur from sulphide-containing gases by reaction with a quantity of air regulated to effect the formation of elemental sulphur which comprises, passing streams of the gas and air to a confined reaction zone, effecting reaction of the mixture in said zone, withdrawing gaseous products of reaction from the said zone at a temperature of between about 1600° F. to about 2400° F., reducing the temperature of such reaction gases to from about 350° to about 700° F., contacting the cooled reaction gases with a catalyst to effect further conversion of sulphur-containing compounds to elemental sulphur, cooling the products of reaction to a temperature of from about 270° F. to about 470° F., condensing and recovering sulphur therefrom by scrubbing the reaction gases with liquid coolant, raising the temperature of the scrubbed gases to between about 400° F. to about 600° F., contacting such preheated scrubbed gases with a catalyst to effect further reaction of the sulphur containing gases thereof to elemental sulfur, and separating and recovering the elemental sulfur thus formed.

4. A method of producing elemental sulphur from sulphide-containing gases by reaction with a quantity of air regulated to effect the formation of elemental sulphur which comprises, passing a mixture of the gas and air through a confined reaction zone, effecting reaction of the mixture in said zone, discharging the reaction gases from the zone at a temperature of the order of from about 1600° F. to about 2400° F., passing such reaction gases to a waste heat boiler to abstract a predetermined quantity of heat therefrom, passing such preliminarily cooled gases through a heat exchanger to reduce the temperature of the reaction gases to the order of from 350° F. to 700° F., contacting such cooled reaction gases with a catalyst to effect further reaction of the sulphur-containing gases to elemental sulphur, reducing the temperature of such reaction gases to between about 270° F. and 400° F., scrubbing such reaction gases with a coolant to condense and recover elemental sulphur therefrom, passing the scrubbed gases through the said heat exchanger to thereby preheat the scrubbed gases to a temperature of between about 350° F. to 600° F., contacting such scrubbed gases with a catalyst to effect conversion of the sulphur-containing compounds therein to elemental sulphur, and scrubbing said reaction gases with a coolant to recover sulphur therefrom.

5. A method of producing elemental sulphur from hydrogen sulphide-containing gases by reaction with a quantity of air regulated to effect the formation of elemental sulphur which comprises, passing streams of the gas and air to a confined reaction zone, effecting reaction of the mixture in said zone, withdrawing gaseous products of reaction from the said zone, cooling said reaction gases to a predetermined temperature of from about 350° F. to about 700° F., contacting the cooled reaction gases with a catalyst to effect further inter-reaction of the sulphur-containing gases to elemental sulphur, cooling the reaction gases so treated, scrubbing the cooled reaction gases to remove the elemental sulphur therefrom, preheating the scrubbed gases to a temperature of between about 350° F. and 700° F., contacting such preheated gases with a catalyst which is effective to convert sulphur-containing compounds to elemental sulphur, and removing and recovering elemental sulphur therefrom.

6. A method of producing elemental sulphur from sulphide-containing gases which includes, feeding the sulphide-containing gases and air under pressure into a restricted passageway having heat transfer surfaces, passing the gas and air mixture through said restricted passageway into a confined reaction zone, directing the gaseous products of reaction discharged from said passageway into heat exchange with the exterior surfaces of said passageway to thereby heat the gaseous materials travelling through said passageway by indirect heat exchange, discharging said gaseous materials from said confined reaction zone at a temperature from about 1600° F. to about 2400° F., cooling the discharged gases to an adjusted temperature of between about 400° F. to 700° F., passing the cooled reaction gases through a bed of catalyst, cooling the reaction products discharged from said catalyst bed, scrubbing the cooled reaction gases with a coolant to recover elemental sulphur therefrom, passing the discharged gases into contact with a catalyst to effect inter-reaction of the remaining sulphur content of said gases to elemental sulfur, and separating and recovering the elemental sulfur therefrom.

7. In a processing system for treating sulphide-containing gases to recover elemental sulphur therefrom which system incorporates a heating zone leading to a catalyst zone, the process which includes, feeding the sulphide-containing gases to said system prior to entry of said gases to said catalyst zone and wherein at least a substantial part of said gases are fed to said heating zone, feeding a substantially stoichiometric quantity of air to said heating zone regulated in amount to effect the formation of elemental sulphur from the sulphide-containing gases fed to the system, effecting reaction in said heating zone of the gas and air supplied thereto, withdrawing the gaseous products of reaction from said heating zone at a temperature of about 1600° F. to about 2400° F., cooling the reaction gases supplied to said catalyst zone to an adjusted temperature of from 400° F. to 700° F., passing the cooled reaction gases into contact with a catalyst in said catalyst zone to effect further inter-reaction of the sulphur-containing gases to elemental sulphur, scrubbing the catalyst treated reaction gases with a coolant to recover the elemental sulphur content of said treated gases, passing the discharged gases into contact with a catalyst to effect inter-reaction of the remaining sulphur content of said gases to elemental sulphur, and separating and recovering the elemental sulphur therefrom.

8. In a processing system for treating sulphide-containing gases to recover elemental sulphur therefrom which system incorporates a heating zone leading to a catalyst zone, the process which includes, feeding the sulphide-containing gases to said system prior to entry of said gases to said catalyst zone and wherein at least a substantial part of said gases are fed to said heating zone, feeding a substantially stoichiometric quantity of air to said heating zone regulated in amount to effect the formation of elemental sulphur from the sulphide-containing gases fed to the system, effecting reaction in said heating zone of the gas and air supplied thereto, withdrawing the gaseous products of reaction from said heating zone at a temperature of about 1600° F. to about 2400° F., cooling the reaction gases, passing the cooled reaction gases into contact with a catalyst in said catalyst zone to effect further inter-reaction of the sulphur-containing gases to elemental sulphur, separating and recovering the elemental sulphur content of said catalyst treated gases, passing the discharged gases into contact with a catalyst to effect inter-reaction of the remaining sulphur content of said gases to elemental sulphur, and separating and recovering the elemental sulphur therefrom.

9. In a processing system for treating sulphide-containing gases to recover elemental sulphur therefrom which system incorporates a heating zone leading to a catalyst zone, the process which includes, feeding the sulphide-containing gases to said system prior to entry of said gases to said catalyst zone and wherein at least a substantial part of said gases are fed to said heating zone, feeding a substantially stoichiometric quantity of air to said heating zone regulated in amount to effect the formation of elemental sulphur from the sulphide-containing gases fed to the system, effecting reaction in said heating zone of the gas and air supplied thereto, withdrawing the gaseous products of reaction from said heating zone at a temperature of about 1600° F. to about 2400° F., cooling the reaction gases supplied to said catalyst zone to an adjusted temperature of from 400° F. to 700° F., passing the cooled reaction gases into contact with a catalyst in said catalyst zone to effect further inter-reaction of the sulphur-containing gases to elemental sulphur, scrubbing the catalyst treated reaction gases with a coolant to recover the elemental sulphur content therefrom, heating the scrubbed gases to a temperature of from 300° F. to 700° F., contacting the scrubbed and heated gases with a catalyst to effect inter-reaction of the remaining sulphur content of said scrubbed gases to elemental sulphur, and separating and recovering the elemental sulphur therefrom.

10. A method of producing elemental sulphur from sulphide-containing gases by reaction with a quantity of air regulated to effect formation of elemental sulphur which comprises passing a reactive gas mixture through a confined reaction zone, effecting reaction of the mixture in said zone, withdrawing gaseous products of reaction from said zone at a temperature of between approximately 1600° F. and 2400° F., cooling the exit reaction gases by indirect heat exchange with the initial reactive gas mixture, scrubbing such cooled reaction gases with a coolant to condense and recover elemental sulphur therefrom, passing the scrubbed reaction gases in indirect heat exchange relationship with gases discharged from the reaction zone to raise the temperature of the scrubbed gases to a temperature of between approximately 400° F. and 600° F., contacting such preheated gases with a catalyst to effect further reaction of the sulphur-containing gases to elemental sulphur, cooling the reaction gases to a temperature of between approximately 270° F. and 500° F., and scrubbing such cooled gases with a coolant further to condense and recover elemental sulphur therefrom.

11. A method of producing elemental sulphur from sulphide-containing gases by reaction with a quantity of air regulated to effect the formation of elemental sulphur which comprises passing a reactive gas mixture through a confined reaction zone, effecting reaction of the mixture in said zone, withdrawing gaseous products of reaction from said zone at a temperature of between approximately 1600° F. and 2400° F., cooling the exit reaction gases, scrubbing said gases with a coolant to condense and recover the elemental sulphur content thereof, mixing the scrubbed gases with a further quantity of sulphide-containing gases, contacting such mixed gases with a catalyst to effect further reaction of the sulphur-containing gases to elemental sulphur, cooling the reacted gases to a temperature of between approximately 270° F. and 500° F., and scrubbing such cooled gases with a coolant further to condense and recover elemental sulphur content therefrom.

12. A method of producing elemental sulphur from hydrogen sulphide-containing gases by reaction with a quantity of air regulated to effect the formation of elemental sulphur which comprises passing a mixture of gas and air to a confined reaction zone, effecting reaction of the mixture in said zone, withdrawing gaseous products of reaction from said zone, passing the gaseous products of reaction in indirect heat exchange relationship with the initial mixture of gas and air, cooling the gaseous reaction products to a predetermined temperature of between approximately 350° F. and 700° F., contacting the cooled reaction gases with a catalyst to effect further inter-reaction of the sulphur-containing gases to elemental sulphur, cooling the reaction gases so treated, scrubbing the cooled reaction gases to remove the elemental sulphur therefrom, preheating the scrubbed gases to a temperature of between approximately 350° F. and 700° F., contacting such preheated gases with a catalyst which is effective to convert sulphur-containing compounds to elemental sulphur, and removing and recovering elemental sulphur therefrom.

13. A method of producing elemental sulphur from hydrogen sulphide-containing gases by reaction with a quantity of air regulated to effect the formation of elemental sulphur which comprises passing a mixture of gas and air to a confined reaction zone, effecting reaction of the mixture in said zone, withdrawing gaseous products of reaction from said zone, cooling said gaseous reaction products to a predetermined temperature of between approximately 350° F. and 700° F., contacting the cooled reaction gases with a catalyst to effect further inter-reaction of the sulphur-containing gases to elemental sulphur, cooling the reaction gases so treated, scrubbing the cooled reaction gases to remove elemental sulphur therefrom, preheating the scrubbed gases to a temperature between approximately 350° F. and 700° F. by passing said gases in indirect heat exchange relationship with gases discharged from the reaction zone, contacting such preheated gases with a catalyst to effect further reaction of the sulphur-containing gases to elemental sulphur, cooling the reaction gases to a temperature of between approximately 270° F. and 500° F., and scrubbing such cooled gases with a coolant to condense and recover elemental sulphur therefrom.

14. A method of producing elemental sulphur from hydrogen sulphide-containing gases by reaction with a quantity of air regulated to effect the formation of elemental sulphur which comprises passing a reactive gas mixture through a confined reaction zone, effecting reaction of the mixture in said zone, withdrawing gaseous products of reaction from said zone, mixing said gaseous reaction products with a further quantity of sulphide-containing gases, cooling the mixed gases, contacting the cooled reaction gases with a catalyst to effect further inter-reaction of the sulphide-containing gases to form elemental sulphur, cooling the reaction gases so treated, scrubbing such cooled reaction gases to condense and recover elemental sulphur therefrom, preheating the scrubbed gases to a temperature of between approximately 350° F. and 700° F., contacting such preheated gases with a catalyst to effect further reaction of the sulphur-containing gases to elemental sulphur, and removing and recovering elemental sulphur content therefrom.

15. A method of producing elemental sulphur from sulphide-containing gases by reaction with a quantity of air regulated to effect the formation of elemental sulphur which comprises passing a mixture of gas and air through a confined reaction zone, discharging the gaseous products of reaction from the zone at a temperature of between approximately 1850° F. and 2000° F., passing the exit gaseous reaction products in indirect heat exchange relationship with the initial mixture of gas and air, passing such cooled gaseous reaction products to a waste heat boiler to abstract a predetermined quantity of heat therefrom, passing the cooled gaseous reaction products through a heat exchanger to reduce the temperature of the gaseous reaction products to a temperature of between approximately 350° F. and 700° F., mixing such cooled reaction products with a further quantity of sulphide-containing gas, contacting such mixed gases with a catalyst to effect further reaction of the sulphide-containing gases to form elemental sulphur, passing the cooled gaseous reaction product through a water-cooled economizer unit to reduce the temperature of such gaseous reaction products to a temperature of between approximately 270° F. and 400° F., utilizing the heated water therefrom as a feed for said waste heat boiler, scrubbing the cooled gaseous reaction products from said economizer with a coolant to condense and recover elemental sulphur content therefrom, passing the scrubbed gases through said heat exchanger to thereby preheat the scrubbed gases to a temperature of between approximately 350° F. and 600° F., contacting such scrubbed gases with a catalyst to effect further conversion of the sulphur-containing compounds therein to elemental sulphur, and scrubbing said gases with a coolant to recover elemental sulphur therefrom.

SAMUEL L. NEVINS.
JAMES S. GILLIAM, Jr.

REFERENCES CITED

The following references are of record in the file of this patent:

UNITED STATES PATENTS

| Number | Name | Date |
| --- | --- | --- |
| 1,922,872 | Thompson | Aug. 15, 1933 |
| 2,021,372 | Mast | Nov. 19, 1935 |
| 2,090,217 | Merriam | Aug. 17, 1937 |
| 2,092,386 | Baehr | Sept. 7, 1937 |
| 2,092,794 | Bacon et al. | Sept. 14, 1937 |
| 2,200,529 | Baehr | May 14, 1940 |
| 2,386,202 | Fernelius et al. | Oct. 9, 1945 |
| 2,403,451 | Nevins et al. | July 9, 1946 |

FOREIGN PATENTS

| Number | Country | Date |
| --- | --- | --- |
| 185,780 | Great Britain | Sept. 7, 1922 |
| 419,787 | Great Britain | Nov. 19, 1934 |

OTHER REFERENCES

Ser. Nos. 362,376 and 398,346, Koppers (A. P. C.), published April 27, 1943.